United States Patent [19]

Lochner

[11] 4,211,593
[45] Jul. 8, 1980

[54] METHOD OF MAKING A NEEDLED AND ORNAMENTALLY PATTERNED FLEECE MATERIAL

[75] Inventor: Herbert Lochner, Kempen, Fed. Rep. of Germany

[73] Assignee: Cikalon Vliesstoffwerk GmbH, Kempen, Fed. Rep. of Germany

[21] Appl. No.: 911,330

[22] Filed: May 31, 1978

Related U.S. Application Data

[63] Continuation of Ser. No. 788,232, Apr. 18, 1977, abandoned.

[51] Int. Cl.² .......................... B32B 7/08; B32B 7/14
[52] U.S. Cl. ..................................... 156/148; 28/109; 428/300
[58] Field of Search ................. 156/72, 148, 290, 291; 28/72.2 R; 428/300

[56] References Cited

U.S. PATENT DOCUMENTS

| | | | |
|---|---|---|---|
| 2,970,365 | 2/1961 | Morgenstern | 156/148 |
| 3,705,064 | 12/1972 | Lochner | 156/72 |
| 3,725,166 | 4/1973 | McCord | 156/148 |
| 3,755,055 | 8/1973 | Lochner | 156/148 |
| 3,794,553 | 2/1974 | Lochner | 28/72.2 R |

Primary Examiner—Caleb Weston
Attorney, Agent, or Firm—Becker & Becker

[57] ABSTRACT

A method of making a needled and ornamentally patterned fleece material according to which at least one one-color first pre-needled web of fleece material including fibers, is prepared followed by substantially binding together at least partially fibers of the first web in those surface sections thereof which correspond to the areas where the ornamentation is desired. Furthermore, a second pre-needled web of fleece material is prepared which has a color differing from the color of the first pre-needled web of fleece material and being free from surface sections with fibers bound together. Subsequently placing the first pre-needled web of fleece material in dry condition in face-to-face contact with the second pre-needled web of fleece material, and commonly needling the first and second webs of fleece material together from the outer side of the second web of fleece material to form a pile on the outer side of the first web of fleece material.

13 Claims, 4 Drawing Figures

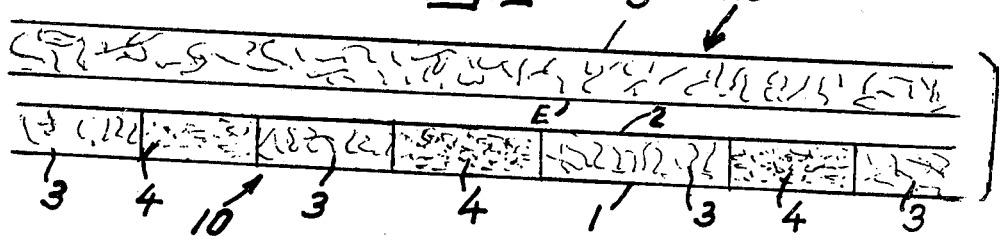
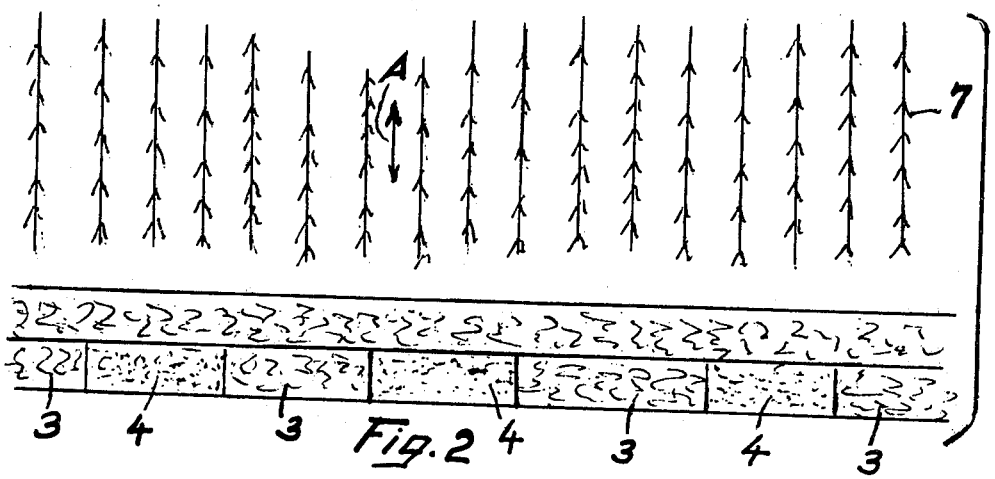
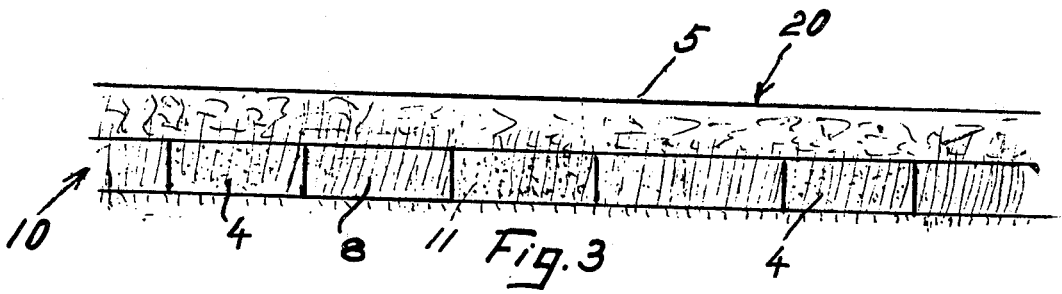
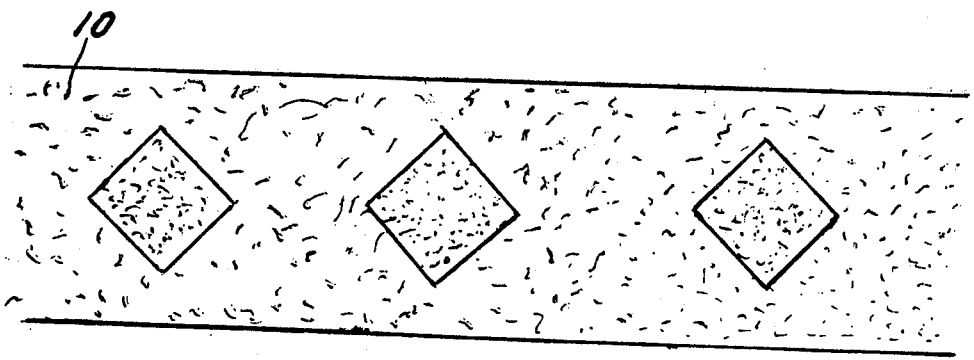

METHOD OF MAKING A NEEDLED AND ORNAMENTALLY PATTERNED FLEECE MATERIAL

This is a continuation of application Ser. No. 788,232-Lochner, filed Apr. 18, 1977, now abandoned.

The present invention relates to a method of preparing a needled and ornamentally patterned fleece material according to which from a one-color pre-needled web of fleece material the fibers are in the surface sections corresponding to the desired ornamentation, glued to each other entirely or partially, whereupon the thus treated web of fleece material which forms the sample fleece is in a dried condition put together with a second web of fleece material which has a different color, is pre-needled and has no surface section with fibers glued together, whereafter both webs of fleece material are needled together.

According to a heretofore known method of the type involved as disclosed in U.S. Pat. No. 3,705,064, the fibers of the web of fleece material forming the sample fleece are by application of glue or binding agents glued together, and the two superimposed needled webs of fleece material which differ by contrasting colors are together needled through from the glued side. According to this known method, it is also possible to produce ornamentally patterned fleece materials with a plurality of basic colors. This is done by employing according to pattern instead of a partially glued sample of fleece a plurality of partially glued sample fleeces with colors differing from each other. This heretofore known method accomplishes that fibers of the non-glued section of the web of fleece material having glue applied thereto are needled through the web of fleece material to be provided with a pattern and form the pattern on the right side thereof and appear as the finished pile, whereas within the region of the glued areas, only a partial needling of the ornamentally patterned web of fleece material with the web of fleece material to be patterned is effected.

It is, therefore, an object of the present invention to provide a method for producing a needled and ornamentally patterned fleece material according to which while fully maintaining the design of the pattern effect, the connection between the individual webs of fleece material is improved within the region of the glued surfaces or areas.

These and other objects and advantages of the invention will appear more clearly from the following specification, in connection with the accompanying drawing, in which:

FIG. 1 is an exploded view showing a side view of two webs of fleece material to be needled.

FIG. 2 shows the webs of fleece material, which are illustrated in FIG. 1, in now superimposed condition prior to the needling operation with the needles employed during the needling operation.

FIG. 3 is a section through the two webs of fleece material needled together.

FIG. 4 is a top view of the finished needled and ornamentally patterned fleece material.

The method according to the present invention is characterized primarily in that the two webs of fleece material are needled from the side of the second web of fleece material for forming a plush pile surface on the outer surface of the web of fleece material which forms the sample fleece. Instead of carrying out the needling through from the web of fleece material which comprises the fibers glued to each other as it has been done heretofore, the needling through is, according to the present invention, effected from the other web of fleece material which has no surface sections with fibers glued to each other. The gluing of the fibers may be effected either by the application of an adhesive or binding agent or by more or less intensive melting-on of the fibers.

The method according to the present invention brings about the advantage that while fully maintaining the design of the patterning effect, a mechanical consolidation of the two-web system is obtained on all sides inasmuch as the fibers of the non-glue-covered second web of fleece material penetrate completely the glued areas of the patterned fleece and connect the two webs of fleece material therewith while forming a pile. The same effect of a complete mechanical connecting system is obtained when a plurality of different colored ornamentally glued webs of fleece material are needled from the side of a further one-colored non-glued web of fleece material and piles are formed on that side which faces away from the non-glued web of fleece material. In the last mentioned instance, multi-colored effects are obtained in the formed pile layer while at each area of the pile needled multi-layer system a complete fiber connection is established.

It has furthermore been found that when superimposing three pre-needled webs of fleece material in the basic colors blue, red and yellow to each of which glue is applied partially in conformity with the desired pattern according to U.S. Pat. No. 3,705,064, it is possible in the pile surface, in addition to the basic colors blue, red and yellow also in a definite manner to create the mixed colors green, purple and brown. This is possible when on one hand the depth of colors of the three basic colors red, blue and yellow are adapted to each other in a suitable manner and/or when the strength, which means for instance with the same denier of the individual webs of fleece material, the square meter weights thereof are brought into suitable strength and weight relationship with regard to each other so that the desired mixed color will be created by a quantity ratio determined thereby between the individual eifferent colored fiber components in the pile.

The web of fleece material to which no glue has been applied will in this connection bring about not only the above described complete connection between the three further partially glued webs of fleece material but also, when in addition to the three basic colors blue, red and yellow this fourth web of fleece material to which no glue has been applied is designed colorless, for instance with white fibers, in conformity with the strength, i.e., the weight of said last mentioned web and the selected denier, the said web of fleece material to which no glue is applied also furnishes the possibility to make the entire multi-colored pattern appearing in the pile layer lighter to a more or less extent. If also said fourth white or practically colorless web of fleece material is partially provided with glue, it will be appreciated that in these regions of the partial glue application, the lightening effect is completely eliminated. It is also possible, by differentiating the depth of penetration of the partial glue application, to obtain color lightening in steps.

On the other hand, if desired, a pure white tone in the sample can be realized by completely gluing together the three-colored webs of fleece material red, blue and yellow where the white web of fleece material is not partially glued so that only the white fiber component of the fourth fleece will at this area form the pile. At any rate, such multi-layer system the individual layers of which are partially glued to a different extent, results in an excellent connection of the entire multi-layer system. In this connection, surprisingly the pile formation is in spite of differently glued components very uniformly built up within the four web systems because with a certain depth of penetration of the pile needle, respectively those fibers are set into the pile which are not partially bound by the glue.

With the above mentioned system of employing four webs of fleece material of the colors red, blue and yellow and an additional colorless web of fleece material, it is possible in a simple manner to provide ornamental multi-color patterns which practically include the entire realm of colors. In this way, there is realized in particular the important advantage that the entire stock-keeping of the raw fibers can be limited to the mentioned three basic colors red, blue and yellow and raw white, and that always with these three same basic colors, all desired other colors and color shades can be realized. The mixed colors obtainable in this connection which are formed in the pile are characterized in particular by brilliance inasmuch as as the original colors are maintained adjacent to each other in the pile and by their combination impart upon the eye the desired color tone in their particular characteristic manner. In view of the applied through-needling technique, such an intensive color mixture is obtained as it can hardly be realized normally in pure mixtures within fibers.

The above mentioned method is of particular importance wherever fibers have to be processed which cannot, or can only under difficulties, be individually colored, or be printed upon when in the article. This is true in particular for instance with regard to polypropylene fibers which are processed preferably after they have been nozzle colored.

Referring now to the drawing in detail, FIG. 1 shows a first non-woven pre-needled web 10 of fleece material. Web 10 has a back side 2 and a front side 1 and has only one color. The surface sections 3 of web 10 are not glued to each other nor has said web 10 surface sections 4 which are entirely or partially glued to each other.

The second pre-needled web 20 of fleece material has a color which contrasts with the color of the first web 10. The second web 20 has a back side 5 and a front side 6 but has no surface sections with fibers glued to each other.

For purposes of producing the needled and ornamentally patterned fleece material, according to FIG. 2, the two webs 10 and 20 of fleece material are placed one upon the other while the front side 6 of the second web 20 rests against the back side 2 of the first web 10. The thus superimposed webs of fleece material are then by means of needles 7 needled to each other while said needles 7 carry out a reciprocatory movement in the direction of the arrow A. The number of needles 7 shown in FIG. 2 has been shown only for purposes of explanation, and it should be kept in mind that in practice a much greater number of needles is employed in this connection. During the needling operation, the fibers of the second web 20 of fleece material are pulled through the first web 10 of fleece material while in addition thereto fibers from the surface sections 3 of the first web 10 of fleece material are carried along by the needles 7. Within the region of the surface sections 4 with the fibers glued to each other, only the fibers of the second web 20 of fleece material are pulled through said surface sections 4, whereas the fibers of these surface sections 4, due to the fact that they are not glued to each other, are not caught by the needles 7 and are not pulled through the front side 1 of the first web 10 of fleece material.

In view of the needling operation, the two webs 10 and 20 of the fleece material are needled to each other substantially in the manner shown in FIG. 3, while on the front side 1 of the first web 10 of fleece material the fibers carried along by the needles 7 form piles 8 so that for instance the pattern is formed which is illustrated in FIG. 4.

There will now be described a specific example for carrying out the method according to the invention.

EXAMPLE

Without employing a carrier web, three pre-needled webs "a", "b" and "c" of fleece material are produced with a width of 430 cm with a surface height of "a" 250 grams, "b" 200 grams and "c" 150 grams polypropylene staple fibers of a length of 80 mm and a strength of 17 detex. Furthermore, a corresponding web "d" of fleece material is produced with a surface weight of 200 grams from a mixture of polyamide fibers respectively having a length of 90 mm and 50% thereof with a strength of 40 detex while the other 50% have a strength of 17 detex of raw white color. The colors of webs "a", "b" and "c" of fleece material are a medium yellow for "a", a medium red for "b" and a medium blue for "c". These colors are obtained by nozzle dyeing.

The webs "a", "b" and "c" of fleece material are according to a cylinder pressure method by means of a binding agent partially glued in such a way that in conformity with a definite repeat system the three webs of fleece material are placed upon each other in conformity with the required pattern and the desired color or colors and yield the unglued portions of the pattern which is provided for the patterning effect desired in connection with the through needling.

The three webs of fleece material which are partially glued in this manner are, after glue has been applied thereto, in conformity with a definite repeat system placed upon each other and subsequently are passed through a channel dryer until the incorporated binding agent has been completely dried. After completion of the drying process, or already prior to entering the channel dryer, the three sample fleeces "a", "b" and "c" are united with the raw white fleece "d" and subsequently thereto are pile needled by means of fork-shaped needles with a depth of penetration of the needles amounting to 10 mm.

The carpet bottom furthermore mechanically strengthened by the four webs of fleece material and furthermore strengthened by the introduced binding agents can now in a manner known per se over its entire surface be strengthened by an additional back sizing, for instance by padding or by scraping latex dispersions on the back side.

The carpet bottom produced in conformity with the above example has on its surface a dense ornamental multi-color patterned fine loop structure with a uniformly high and uniformly dense pile surface distributed over the entire width of the carpet bottom. In the pattern of the carpet bottom, at the desired areas the colors blue, red, yellow, green, purple, brown and white as well as shades thereof will appear which by a finer or coarser rastering action, and consequently thinner or thicker partial gluing action can be realized at the individual areas of the different webs of fleece material.

By additional more or less strong full surface or partial gluing of the raw white webs "d" of fleece material, it is additionally possible by means of this web of fleece material to more or less weaken the depth of penetration of all colors. The intensity of the respective gluing of the web "d" of fleece material is likewise brought about by coarser or finer rastering action of the pressure cylinder. The gluing operation correspond in all instances to a conventional printing operation with dies with the difference that instead of dye pastes, a binding agent or glue is employed.

As chemical binders may be used crosslinked polyacrylic esters, butadieneacrylonitrile, butadienestyrene, and similar compounds. Of the suitable adhesives to be used for the surface gluing in the process according to the invention, very satisfactory results are obtained with gluten glues of medium viscosity and gelling stability. However, it is also possible to use any one of the synthetic adhesives provided they are binders having comparatively high melting points with the exception of thermoplasts which are not suited for this process.

It is, of course, to be understood that the present invention is, by no means, limited to the specific showing in the drawings, but also comprises any modifications within the scope of the appended claims.

What I claim is:

1. A method of making a needled fleece fabric material, which includes the steps of: preparing at least one first preneedled web of fibrous fleece material including fibers and binding together at least partially the fibers of said first web by adhering the fibers of certain areas, preparing a second pre-needled web of fleece material free from adhering fibers in certain areas, placing said first web of fleece material in face-to-face contact with said second web of fleece material in such manner that the back side of the first web of fleece material provided with adhering fibers is in contact with the front side of the second web of fleece material free from adhering fibers in certain areas, and commonly needling said first and second webs of fleece material from the back side of said second web in areas which have no adhering fibers through the two webs and through the areas of said first web which have adhering fibers to form a solid connection of material all over from the back side of said second web through the entire first web in areas both with and without adhering fibers over the entire surface of fleece material needled with each other to form a pile visible on the front side of said first web of fleece material having fibers from said second web.

2. A method according to claim 1, which includes the steps of: preparing a plurality of first pre-needled webs of fleece material of different colors at least three in number, placing said plurality of first pre-needled webs of fleece material upon said second pre-needled web of fleece material, and from said last mentioned second web of fleece material needling through said plurality of first webs of fleece material to form a pile on the outside of the outermost first web of fleece material.

3. A method according to claim 2, in which said plurality of said first webs of fleece material includes the webs of the colors blue, red and yellow, respectively.

4. A method according to claim 3, in which said second web of fleece material is a web selected from the group consisting of white and colorless.

5. A method according to claim 1, in which the fibers of each web of fleece material comprising a pattern are at least partially bound to each other by partially melting the fiber sections to be connected to each other.

6. A method of making a needled fleece fabric material which includes the steps of: preparing at least one first pre-needled web of fibrous fleece material including fibers and binding together at least partially the fibers in certain areas of said first web with adhesive means to cause adherence of said fibers in said certain areas, preparing a second web of fleece material free of adhering fibers, placing said first web of fleece material in face-to-face contact with said second web of fleece material in such a manner that the back side of the first web of fleece material provided with adhering fibers is in contact with the front side of the second web of fleece material free from adhering fibers, and commonly needling said first and second webs of fleece material from the back side of said second web through the two webs including the areas of said first web which have adhesive means to form a connection of material all over from the back side of said second web through the entire first web in areas with and without adhesive means to form a pile visible on the front side of said first web of fleece material having fibers from said second web.

7. A method according to claim 6, in which the fibers of each web of fleece material which comprises a pattern are bound together by adhesive means selected from the group consisting of a glue and a binder, and in which the penetration of said adhesive means into said webs of fleece material is controlled by raster means.

8. A method of making a needled and ornamental, patterned fleece fabric material which includes the steps of: preparing a plurality of first pre-needled webs of fibrous fleece material of different colors, binding together the fibers of certain areas of each of said webs by adhering the fibers in said certain areas in certain patterns in said webs, preparing a second web of fleece material having a color different from the color of any of said first webs and free of adhering fibers, placing said first webs of different colors in face-to-face, front-to-back contact, placing said second web in contact with the back of said plurality of said first webs, and commonly needling said plurality of first webs and said web of fleece material from the back side of said second web which has no adhering fibers through said second web and through said plurality of first webs including the areas of said first webs which have adhesive means to form a connection of material all over from the back side of said second web through the entire area of each of said first webs to form a pile on the front side of said plurality of said first webs having fibers of different colors from said second and first webs, said pile having fibers in colors corresponding to non-adhering areas of said plurality of first webs to form a pattern in colors corresponding to the patterns in said first webs of fleece material.

9. In a method for the manufacture of a needle-felted and patterned non-woven fabric, wherein the fibers of a single-color pre-needle-felted non-woven fabric web, in surface zones corresponding to a desired pattern, are at least partially bonded together whereby said non-woven fabric web acts as a pattern-forming non-woven fabric web, said pattern-forming web being placed on a second, differently-colored, pre-needle-felted non-woven fabric web without surface zones of bonded together fibers and following which both non-woven fabric webs are, in a dry state, needle-felted together, the step in combination therewith comprising joining the two non-woven fabric webs by being needle-felted from the side of the second non-woven fabric web for the formation of a pile surface on the exterior surface of the non-woven fabric web acting as the pattern-forming non-woven fabric web.

10. A method in combination according to claim 9, wherein there is a step of having the fibers of each of the pattern-forming non-woven fabric webs bonded together by a step of applying an adhesive or bonding agent, various depths into the various non-woven fabric webs by the use of variously-coarse grid patterns on printing cylinders employed for applying the adhesive or bonding agent.

11. A method in combination according to claim 9, wherein characterised in that the fibers of each of the non-woven fabric webs acting as pattern-forming non-woven fabric webs are at least partially bonded together by variously-intensive fusing together of fibers.

12. A method in combination according to claim 9, including steps of placing a plurality of variously-colored pattern-forming non-woven fabric webs, the fibers of which in certain surface zones are bonded together, in location on the non-woven fabric web without surface zones with bonded together fibers and effecting needle-felting from this latter non-woven fabric web so as to generate a pile surface on the outside of the uppermost or outermost non-woven fiber web having bonded together fibers.

13. A method in combination according to claim 12, including a step of using three non-woven fabric webs colored blue, red and yellow having fibers which are bonded together at defined surface zones.

* * * * *